United States Patent
Hirota et al.

[11] Patent Number: 5,839,275
[45] Date of Patent: Nov. 24, 1998

[54] FUEL INJECTION CONTROL DEVICE FOR A DIRECT INJECTION TYPE ENGINE

[75] Inventors: Shinya Hirota; Kazuya Kibe; Tatsuji Mizuno, all of Susono; Satoshi Iguchi, Mishima; Toshiaki Tanaka, Numazu, all of Japan

[73] Assignee: Toyota Jidosha Kabushiki Kaisha, Aichi, Japan

[21] Appl. No.: 911,811

[22] Filed: Aug. 15, 1997

[30] Foreign Application Priority Data

Aug. 20, 1996 [JP] Japan ................................. 8-218643
Aug. 20, 1996 [JP] Japan ................................. 8-218671

[51] Int. Cl.$^6$ ............................... F01N 3/20; F02D 41/34
[52] U.S. Cl. ............................... 60/285; 60/284; 123/300
[58] Field of Search ........................... 60/274, 284, 285; 123/299, 300

[56] References Cited

U.S. PATENT DOCUMENTS

| | | | |
|---|---|---|---|
| 4,452,040 | 6/1984 | Kobashi | 60/285 X |
| 5,343,702 | 9/1994 | Miyajima et al. | 60/285 |
| 5,479,775 | 1/1996 | Kraemer et al. | 60/285 X |
| 5,642,705 | 7/1997 | Morikawa et al. | 123/300 |

FOREIGN PATENT DOCUMENTS 4-231645  8/1992  Japan.

Primary Examiner—Tony M. Argenbright
Attorney, Agent, or Firm—Kenyon & Kenyon

[57] ABSTRACT

A fuel injection control device for a direct injection type engine having an exhaust passage and a NO$_x$ catalyst arranged therein to purify NO$_x$ in exhaust gas discharged from the engine comprises fuel injectors for injecting fuel into a cylinder. The injecting operation of the fuel injectors is controlled to carry out a main fuel injection at the latest at the beginning of a power stroke of the engine. The injecting operation of the fuel injectors is controlled to carry out a sub fuel injection at one of a power stroke and an exhaust stroke of the engine after the main fuel injection is completed to increase an amount of hydrocarbon in the exhaust gas. The injecting operation of the fuel injectors is controlled to carry out an additional sub fuel injection after the main fuel injection is completed and before the sub fuel injection is carried out.

9 Claims, 8 Drawing Sheets

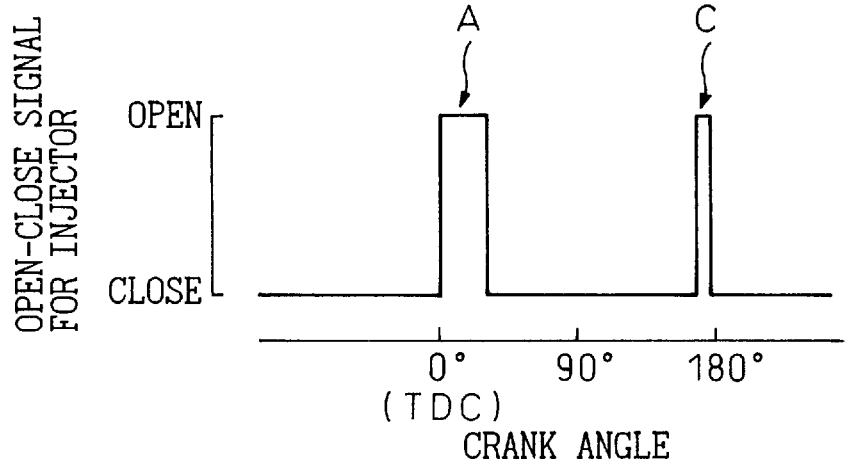
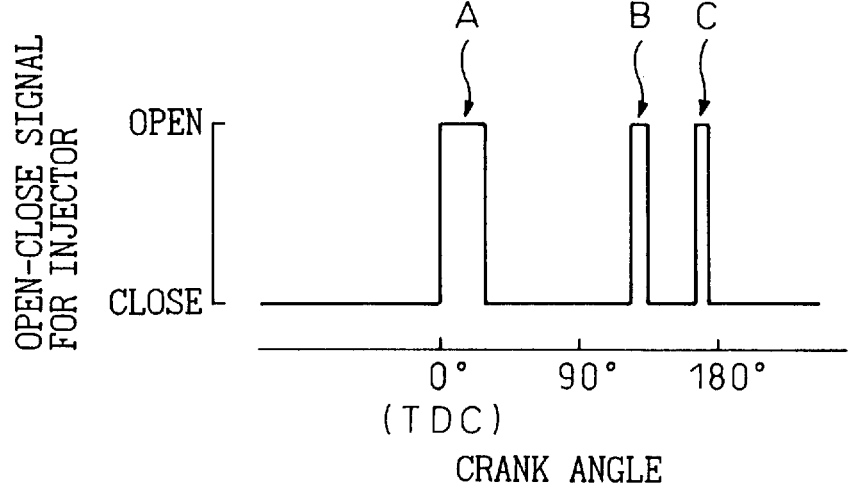

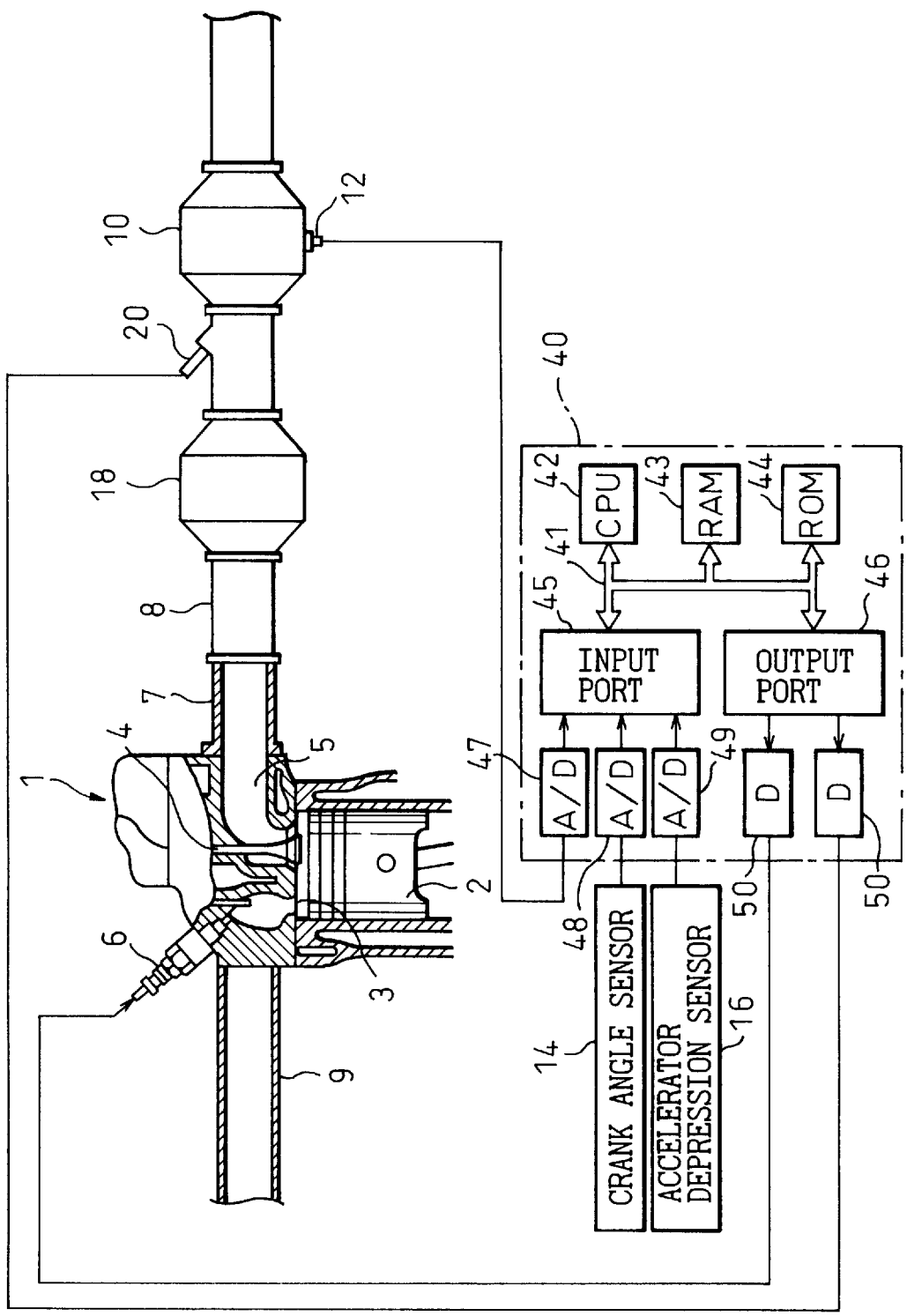

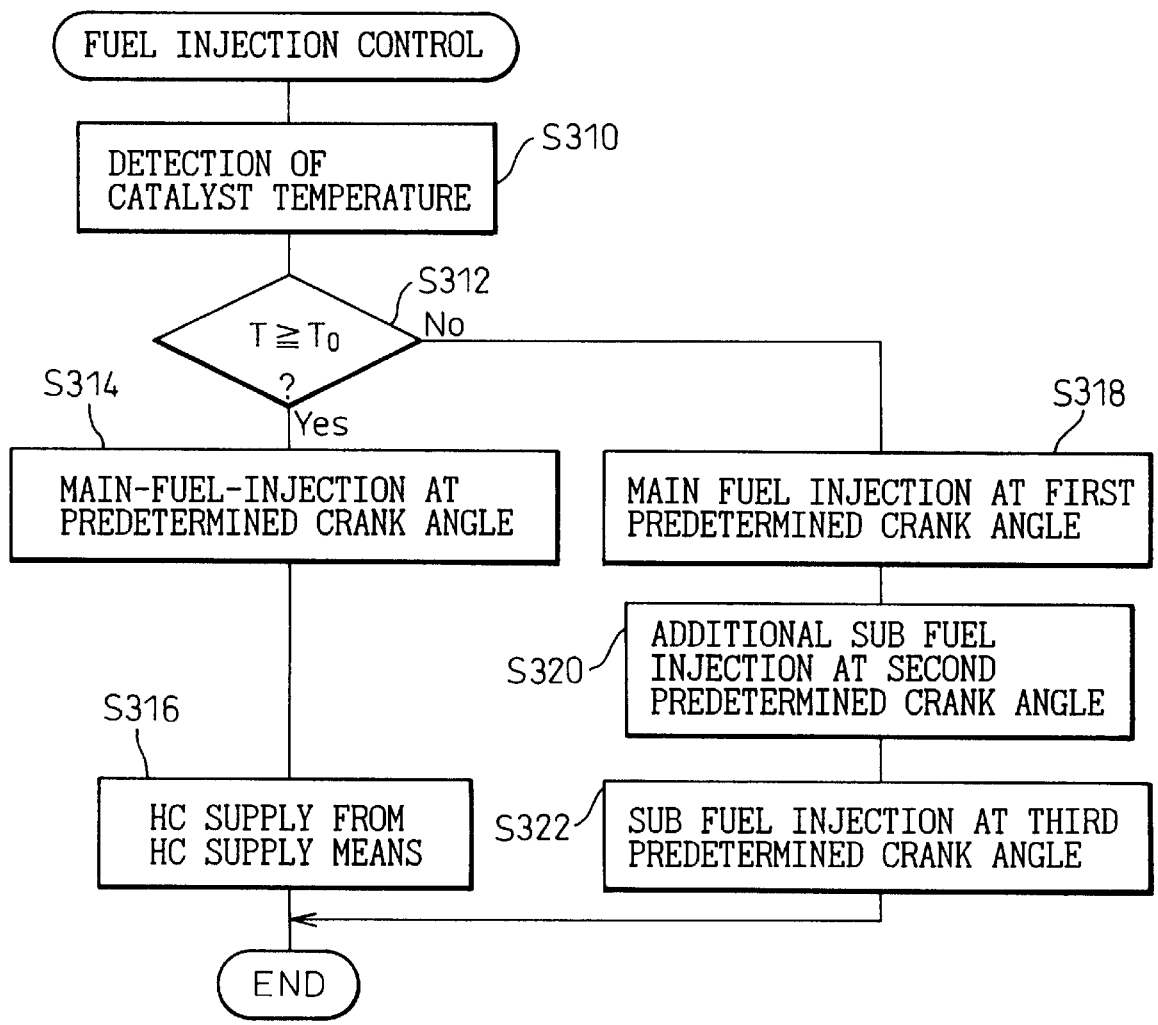

FUEL INJECTION CONTROL DEVICE FOR A DIRECT INJECTION TYPE ENGINE

BACKGROUND OF THE INVENTION

1. Field of the Invention

The invention relates to a fuel injection control device for a direct injection type engine.

2. Description of the Related Art

A lean-burn engine is known, in which, in order to save fuel, an air-fuel ratio of an air-fuel mixture to be fed into combustion chambers of the engine is made lean compared to the stoichiometric ratio during almost all engine operations. A large amount of $NO_x$ is discharged from the lean-burn engine since the air-fuel mixture for the lean-burn engine includes much oxygen. Therefore, it is necessary to arrange a catalyst for purifying the $NO_x$. In an exhaust passage of the engine.

A $NO_x$ catalyst is known which purifies the $NO_x$ with hydrocarbon (HC) under an oxygen-rich exhaust gas. However, in the lean-burn engine, little HC can be fed into the $NO_x$ catalyst since almost all HC fed into the cylinders of the engine is burned in the cylinders. Therefore, the $NO_x$ catalyst cannot purify all the $NO_x$ in the exhaust gas. Note that, in this specification, an exhaust gas including much more oxygen than an exhaust gas resulting from burning a stoichiometric air-fuel mixture is referred to an oxygen-rich gas.

Japanese unexamined patent publication (Kokai) No. 4-231645 discloses a lean-burn type of a direct injection type engine, in which a main fuel for driving the engine is injected from a fuel injector into the cylinder, and a secondary fuel for purifying the $NO_x$ in the $NO_x$ catalyst is directly injected into the cylinder from the same fuel injector after the main fuel is fed.

By the way, the $NO_x$ catalyst purifies the $NO_x$ within a predetermined temperature range. Therefore, when the temperature of the $NO_x$ catalyst is not within the predetermined temperature range, the $NO_x$ catalyst does not purify the $NO_x$ in the exhaust gas.

SUMMARY OF THE INVENTION

Accordingly, the object of the invention is to maintain a temperature of a $NO_x$ catalyst at a temperature within a predetermined temperature range in which the $NO_x$ catalyst purifies the $NO_x$ with the HC.

According to the present invention, there is provided a fuel injection control device for a direct injection type engine having an exhaust passage and a $NO_x$ catalyst arranged therein to purify $NO_x$. In the exhaust gas discharged from the engine, the device comprising: fuel injection means for injecting fuel into a cylinder; main fuel injection control means for controlling the injecting operation of the fuel injection means to carry out a main fuel injection at the latest at the beginning of a power stroke of the engine; sub fuel injection control means for controlling the injecting operation of the fuel injection means to carry out a sub fuel injection at one of a power stroke and an exhaust stroke of the engine after the main fuel injection is completed to increase an amount of hydrocarbon in the exhaust gas; and additional sub fuel injection control means for controlling the injecting operation of the fuel injection means to carry out an additional sub fuel injection after the main fuel injection is completed and before the sub fuel injection is carried out.

Further, according to the present invention, the additional sub fuel injection means carries out the additional sub fuel injection when the temperature of the $NO_x$ catalyst is lower than a predetermined temperature, and stops the additional sub fuel injection when the temperature of the $NO_x$ catalyst exceeds the predetermined temperature.

Further, according to the present invention, the fuel from the additional sub fuel injection is burned.

Further, according to the present invention, the additional sub fuel injection is carried out at a crank angle between the top dead center of the power stroke and 120 degrees after the top dead center of the power stroke.

Further, according to the present invention, the additional sub fuel injection is carried out at a crank angle between 90 degrees after the top dead center of the power stoke and 120 degrees after the top dead center of the power stroke.

Further, according to the present invention, the fuel from the additional sub fuel injection changes to thermally decomposed hydrocarbon.

Further, according to the present invention, the additional sub fuel injection is carried out at a crank angle between 90 degrees after the top dead center of the power stroke and 150 degrees after the top dead center of the power stroke.

Further, according to the present invention, the additional sub fuel injection is carried out at a crank angle between 90 degrees after the top dead center of the power stroke and 120 degrees after the top dead center of the power stroke.

Further, according to the present invention, an oxidizing catalyst for oxidizing carbon monoxide in the exhaust gas is arranged in the exhaust passage upstream of the $NO_x$ catalyst, hydrocarbon feeding means for feeding hydrocarbon into the $NO_x$ catalyst is arranged in the exhaust passage between the oxidizing catalyst and the $NO_x$ catalyst, hydrocarbon feeding control means is provided for controlling the feeding operation of the hydrocarbon feeding means, the hydrocarbon feeding control means carries out the feeding operation of the hydrocarbon feeding means and the sub fuel injection control means and the additional sub injection control means stops the sub fuel injection and the additional sub fuel injection, respectively, when the temperature of the $NO_x$, catalyst is higher than a predetermined temperature, and the hydrocarbon feeding control means stops the feeding operation of the hydrocarbon feeding means and the sub fuel injection control means and the additional sub injection control means carry out the sub fuel injection and the additional sub fuel injection, respectively, when the temperature of the $NO_x$ catalyst is lower than the predetermined temperature.

The present invention may be more fully understood from the description of the preferred embodiments of the invention set forth below, together with the accompanying drawings.

BRIEF DESCRIPTION OF THE DRAWINGS

In the drawings:

FIGS. 8 and 9 are a view illustrating a relationship between a crank angle and an open-close signal for a fuel injector according to a second embodiment of the invention;

FIG. 11 is a view of a fuel injection control device of a direct injection type engine according to a third embodiment of invention; and FIG. 12 is a flowchart of a fuel injection control according to the third embodiment of the invention.

DESCRIPTION OF THE PREFERRED EMBODIMENTS

Figure 1:
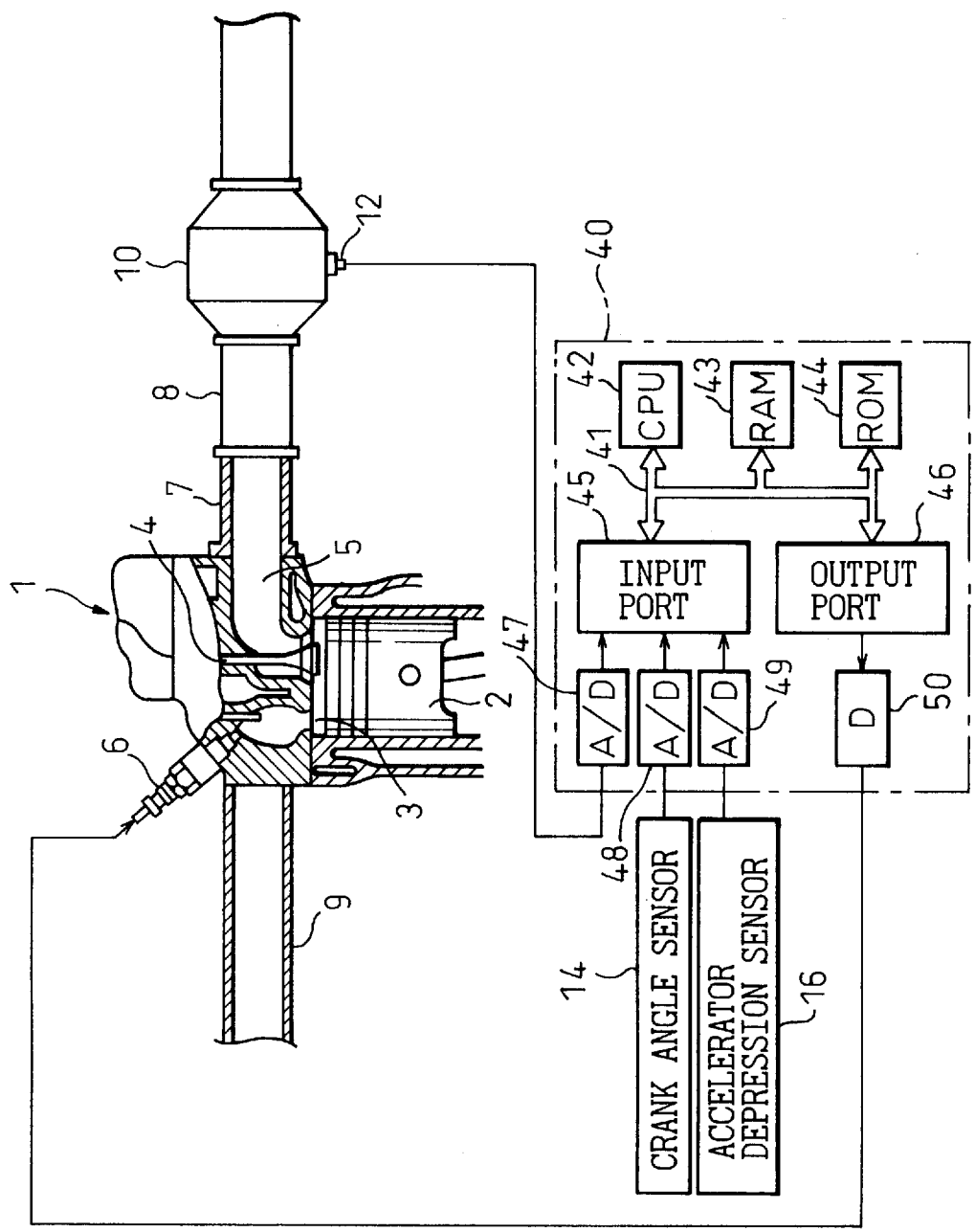
FIG. 1 is a view of a fuel injection control device of a direct injection type engine according to a first embodiment of the invention.

Referring to FIG. 1, a reference number 1 is an engine body of a direct injection type of compression-ignition combustion engine. The engine body 1 has four combustion chambers 3 (only one is shown in FIG. 1). A piston 2 is positioned in each combustion chamber 3. An intake passage 9 for feeding air into the combustion chambers 3 is connected to the engine body 1 via intake ports (not shown). An exhaust manifold 7 for discharging exhaust gas from the combustion chambers 3 is connected to the engine body 1 via exhaust ports 5 (only one is shown in FIG. 1). An exhaust valve 4 is positioned in each exhaust port 5. The engine body 1 has four fuel injectors 6 (only one is shown in FIG. 1) for directly injecting fuel into the corresponding combustion chamber 3.

Figure 2:
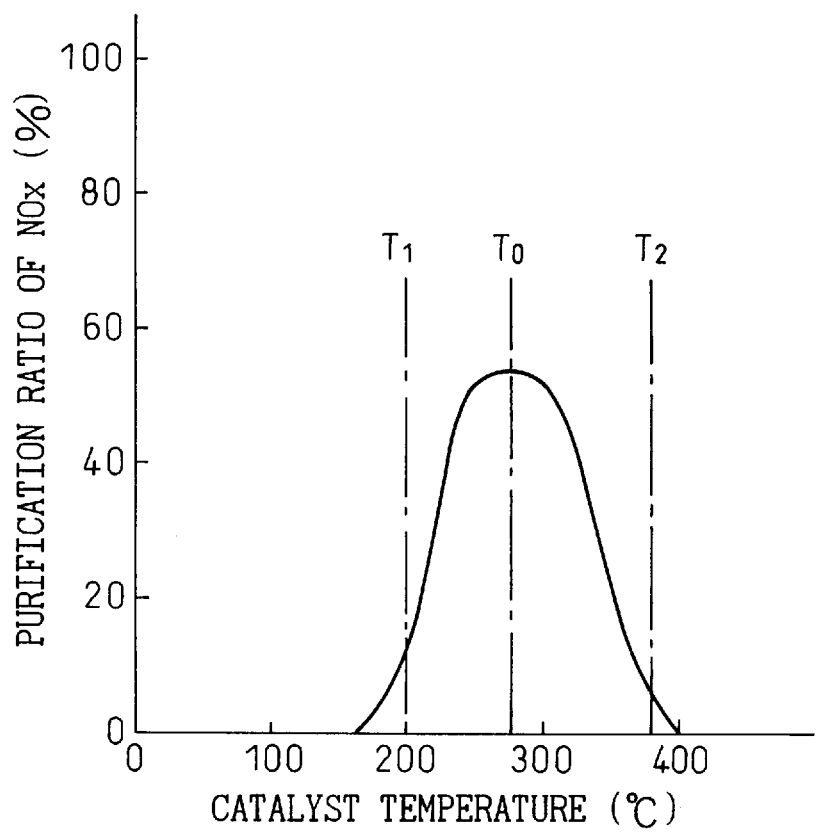
FIG. 2 is a view illustrating a relationship between a $NO_x$ catalyst temperature and a purification ratio of $NO_x$.

The exhaust manifold 7 is connected to an exhaust passage 8. A $NO_x$ catalyst 10 for purifying $NO_x$ in the exhaust gas is arranged in the exhaust passage 8. The purification ratio of the $NO_x$ depends on temperature of the $NO_x$ catalyst 10 as shown in FIG. 2. The $NO_x$ catalyst 10 purifies the $NO_x$ with hydrocarbon under an oxygen-rich atmosphere within a predetermined temperature range between a lower temperature $T_1$ and a higher temperature $T_2$. The purification ratio of the $NO_x$ is highest at a most suitable temperature $T_0$ of the $NO_x$ catalyst 10. Note that the lower temperature $T_1$ is lower than the higher temperature $T_2$, and the most suitable temperature is higher than the lower temperature $T_1$ and is lower than the higher temperature $T_2$. Further note that the hydrocarbon is referred to as "HC" in this specification.

A temperature sensor 12 for generating a voltage in proportion to the temperature of the $NO_x$ catalyst 10 is arranged in the $NO_x$ catalyst 10.

An electronic control unit (ECU) 40 is a digital computer and comprises a central processing unit (CPU) 44, a random access memory (RAM) 43, a read only memory 42 (ROM), an input port 45 and an output port 46. These components are interconnected by a bidirectional bus 41. The temperature sensor 12 is connected to the input port 45 via an A-D converter 47. A crank angle sensor 14 is connected to the input port 45 via an A-D converter 48. The crank angle sensor 30 provides an output pulse at, for example, every 30 degrees of the rotation of a crank shaft (not shown) of the engine. An accelerator depression sensor 16 for generating a voltage in proportion to degree of depression of an accelerator (not shown) is connected to the input port 45 via an A-D converter 49. The CPU 44 calculates engine speed of the engine on the basis of the output voltages of the crank angle sensor 14 and the accelerator depression sensor 16.

On the other hand, the output port 46 is connected to the fuel injector 6 via a drive circuit 50.

On the operation of the fuel injection control device according to the first embodiment, at first, it is judged if temperature T of the $NO_x$ catalyst 10 exceeds the most suitable temperature $T_0$.

Figure 3:
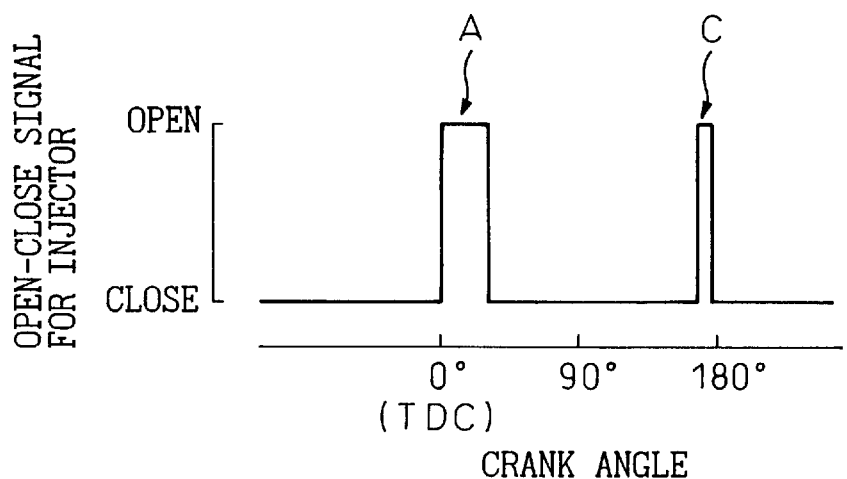
FIGS. 3 and 4 are a view illustrating a relationship between a crank angle and an open-close signal for a fuel injector according to the first embodiment of the invention.

When the temperature T of the $NO_x$ catalyst 10 exceeds the most suitable temperature $T_0$, it is determined that it is not necessary to increase the temperature of the $NO_x$ catalyst 10 in order to continuously make the temperature of the $NO_x$ catalyst 10 the most suitable temperature $T_0$. Therefore, a main fuel injection A (FIG. 3) to inject fuel from the fuel injector 6 into the combustion chamber 3 is carried out at a first predetermined crank angle. Note that the first predetermined crank angle is at the beginning of the power stroke, or just after the compression stroke of the engine is completed. In the first embodiment, the main fuel injection A is carried out at about the top dead center of the power stroke of the engine. Fuel injected at the first predetermined crank is burned in the combustion chamber 3 to drive the engine.

Then, a sub fuel injection C (FIG. 3) to inject fuel from the fuel injector 6 into the combustion chamber 3 is carried out at a third predetermined crank angle. Note that the third predetermined crank angle is at the end of the power stroke of the engine. In the first embodiment, the sub fuel injection C is carried out at about 180 degrees after the top dead center of the power stroke of the engine. Fuel injected at the third predetermined crank angle is not burned and not thermally decomposed. The high-boiling-point HC flows into the $NO_x$ catalyst 10 to purify the $NO_x$. Note that the hydrocarbon having a relatively high boiling point is referred to as "high-boiling-point HC" in this specification.

Figure 4:
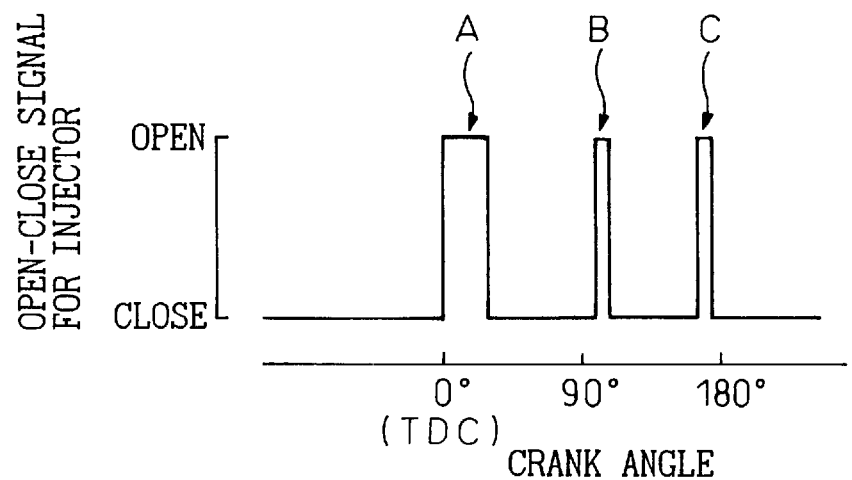

When the temperature T of the $NO_x$ catalyst 10 is lower than the most suitable temperature $T_0$, it is determined that it is necessary to increase the temperature of the $NO_x$ catalyst 10 to continuously make the temperature of the $NO_x$ catalyst 10 the most suitable temperature $T_0$. Therefore, the main-fuel injection A (FIG. 4) to inject fuel from the fuel injector 6 into the combustion chamber 3 is carried out at the first predetermined crank angle.

Then, an additional sub fuel injection B (FIG. 4) to inject fuel from the fuel injector 6 into the combustion chamber 3 is carried out at a second predetermined crank angle. Note that the second predetermined crank angle is at the middle of the power stroke of the engine. In the first embodiment, the additional sub fuel injection B is carried out at about 100 degrees after the top dead center of the engine. Fuel injected at the second predetermined crank angle is burned in the combustion chamber 3 to increase the temperature of the exhaust gas. The exhaust gas flows into the $NO_x$ catalyst 10 to increase the temperature of the $NO_x$ catalyst 10 to the most suitable temperature $T_0$.

Then, the sub fuel injection C (FIG. 4) to inject fuel from the fuel injector 6 into the combustion chamber 3 is carried out at the third predetermined crank angle. Fuel injected at the third predetermined crank angle is not burned and not thermally decomposed. The high-boiling-point HC flows into the $NO_x$ catalyst 10 to purify the $NO_x$.

Note that an amount of the fuel injected at the main fuel injection A is calculated on the basis of a required torque of the engine, an amount of the fuel injected at the additional sub fuel injection B is calculated on the basis of the temperature of the $NO_x$ catalyst 10, and an amount of the fuel injected at the sub fuel injection C is calculated on the basis of the amount of the $NO_x$ flowing into the $NO_x$ catalyst 10 and the temperature of the $NO_x$ catalyst 10.

According to the first embodiment, the amount of the $NO_x$ flowing into the $NO_x$ catalyst 10 is estimated from the amount of the $NO_x$ in the exhaust gas discharged from the engine. That is, the higher the engine speed N becomes, the more the amount of the exhaust gas discharged from the engine per unit time increases. Further, the higher the engine load becomes, i.e., the larger the degree of the accelerator depression is, the larger the amount of the $NO_x$ discharged from the engine per unit time becomes since the higher the engine load becomes, the greater the amount of the exhaust gas discharged from the combustion chamber 3 becomes and further the higher the combustion temperature becomes.

Figure 5:
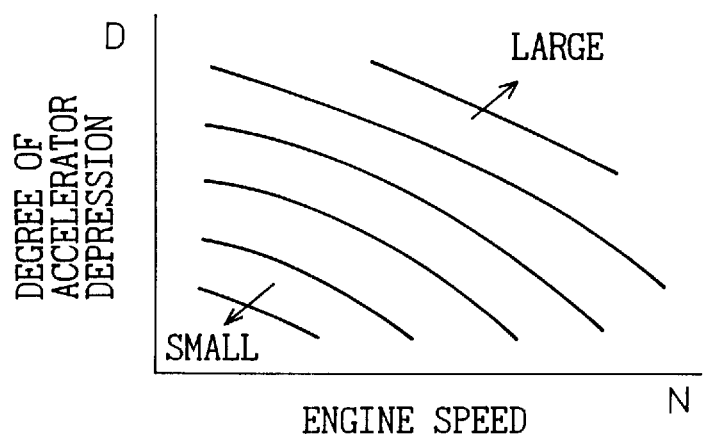
FIG. 5 is a view illustrating a relationship between an engine speed, a degree of accelerator depression and an amount of $NO_x$ discharged from the engine.
Figure 6:
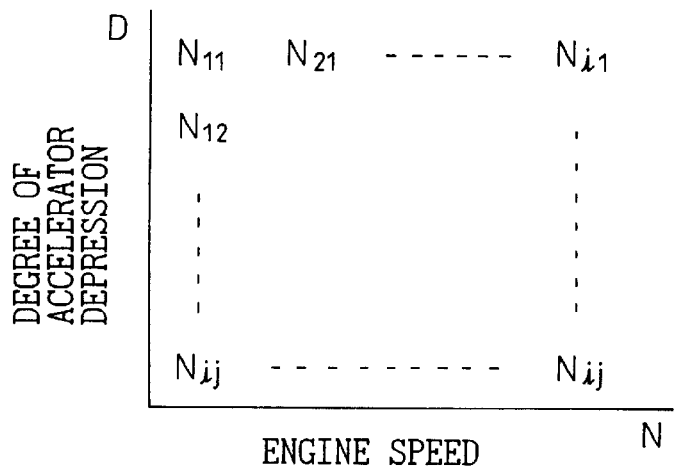
FIG. 6 is a view illustrating a relationship between the engine speed and the degree of accelerator depression.

FIG. 5 shows a relationship between the amount of the $NO_x$ discharged from the engine per unit time, the degree of the accelerator depression D and the engine speed N as found by experiment. In FIG. 5, curves show identical amounts of $NO_x$. As shown in FIG. 5, the amount of the $NO_x$ discharged from the engine per unit time becomes larger as the degree of the accelerator depression D becomes greater, and/or the engine speed N becomes higher. The amount of the $NO_x$ shown in FIG. 5 is stored in the ROM 32 in advance in the form of a map as shown in FIG. 6.

Although, according to the first embodiment, the main fuel injection A is carried out at the beginning of the power stroke of the engine, this does not limit the invention. The main fuel injection A may be carried out at the latest at the beginning of the power stroke.

Further, although, according to the first embodiment, the additional sub fuel injection B is carried out at the middle of the power stroke of the engine, this does not limit the invention. The additional sub fuel injection B may be carried out at a crank angle between the top dead center of the power stroke and 120 degrees after the top dead center of the power stroke if, at the crank angle, the temperature in the combustion chamber 3 is so high that fuel injected at the additional fuel injection can be burned.

However, fuel injected at the crank angle between the top dead center of the power stroke and 90 degrees after the top dead center of the power stroke is burned when fuel injected at the main-fuel injection A is burned. The burning of fuel injected at the crank angle between the top dead center of the power stroke and 90 degrees after the top dead center of the power stroke leads to the torque change of the engine. Therefore, preferably, the additional sub fuel injection B may be carried out at the crank angle between 90 degrees after the top dead center of the power stroke and 120 degrees after the top dead center of the power stroke.

Further, although, according to the first embodiment, the sub fuel injection C is carried out at the end of the power stroke of the engine, this does not limit the invention. The sub fuel injection C may be carried out at the crank angle between 150 degrees after the top dead center of the power stroke and 360 degrees after the top dead center of the power stroke if, at the crank angle, the temperature in the combustion chamber 3 is not so high that fuel injected at the sub fuel injection can be burned or thermally decomposed.

Figure 7:
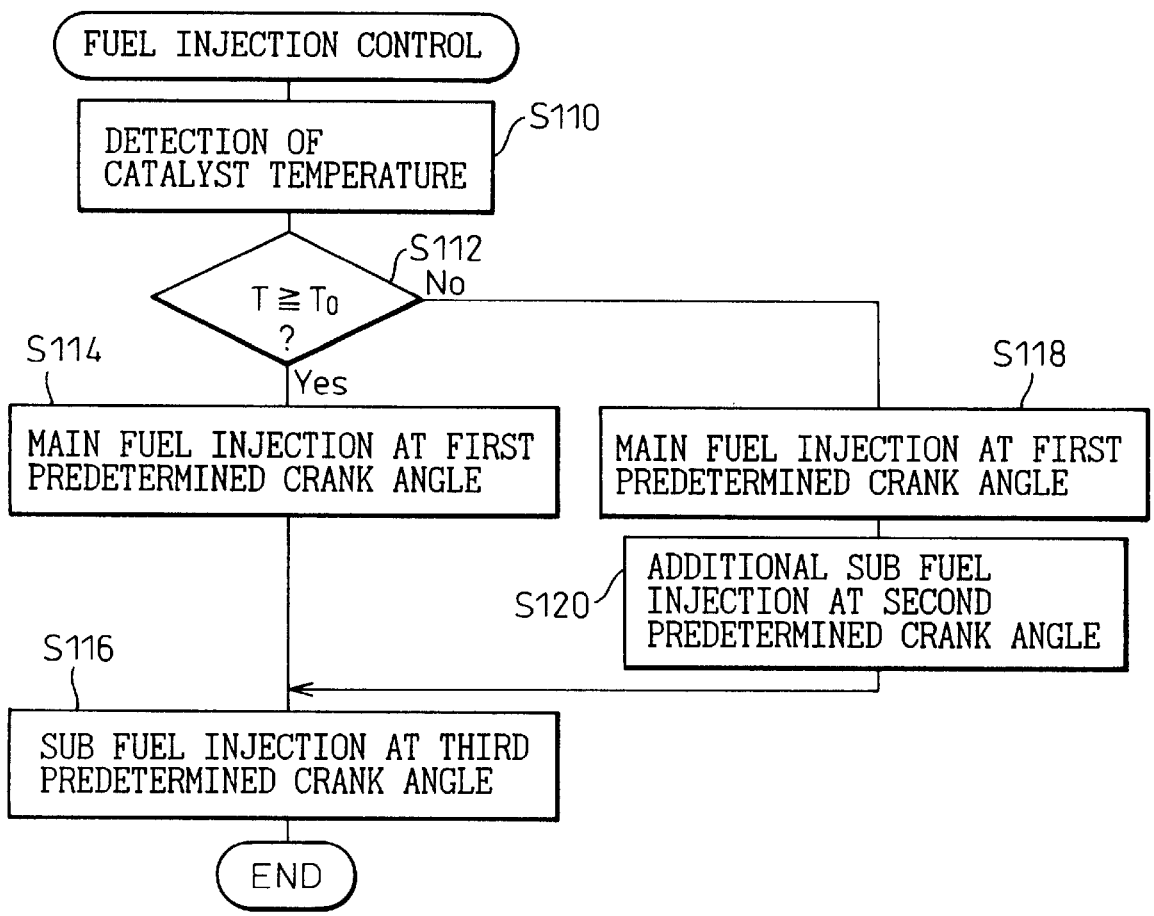
FIG. 7 is a flowchart of a fuel injection control according to the first embodiment of the invention.

FIG. 7 shows a flowchart illustrating fuel injection control according to the first embodiment. At step 110, the temperature T of the $NO_x$ catalyst 10 is detected, and the routine proceeds to step 112.

At step 112, it is judged if the temperature T of the $NO_x$ catalyst 10 exceeds the most suitable temperature $T_0$ ($T \geq T_0$). At step 112, when $T \geq T_0$, the routine proceeds to step 114, where the main-fuel injection A is carried out at the first predetermined crank angle, and the routine proceeds to step 116, where the sub fuel injection C is carried out at the third predetermined crank angle, and the processing cycle is ended.

On the other hand, at step 112, when $T<T_0$, the routine proceeds to step 118, where the main-fuel injection A is carried out at the first predetermined crank angle, the routine proceeds to step 120, where the additional sub fuel injection B is carried out at the third predetermined crank angle, and the routine proceeds to step 116, where the sub fuel injection C is carried out at the third predetermined crank angle, and the processing cycle is ended.

Although, according to the first embodiment, the additional sub fuel injection B is determined to be carried out on the basis of the comparison of the temperature of the $NO_x$ catalyst 10 with the most suitable temperature, this does not limit the invention. The sub fuel injection C may be carried out when the temperature of the $NO_x$ catalyst 10 is within a suitable temperature range in which the $NO_x$ catalyst 10 purifies the $NO_x$ at a relatively high ratio (for example, between the temperatures $T_1$ and $T_2$ in FIG. 2), the additional sub fuel injection B may be carried out when the temperature of the $NO_x$ catalyst 10 is lower than the suitable temperature range, and no sub-fuel injection may be carried out when the temperature of the $NO_x$ catalyst 10 is higher than the suitable temperature range.

Note that, in the specification, a ratio of the total amount of air fed into the intake passage, the combustion chamber, and the exhaust passage upstream of a certain position in the exhaust passage to the total amount of fuel fed into the intake passage, the combustion chamber and the exhaust passage upstream of the above-mentioned position is referred to an air-fuel ratio of the exhaust gas.

A fuel injection control device of a direct injection type engine according to a second embodiment will be described in below. Explanations of the components of the fuel injection control device according to the second embodiment are omitted since these components are the same as the device according to the first embodiment.

During the operation of the fuel injection control device according to the second embodiment, first, it is judged if temperature T of the $NO_x$ catalyst 10 exceeds the most suitable temperature $T_0$.

When the temperature of the $NO_x$ catalyst 10 exceeds most suitable temperature $T_0$, it is determined that it is not necessary to increase the temperature of the $NO_x$ catalyst 10 in order to continuously make the temperature of the $NO_x$ catalyst 10 the most suitable temperature $T_0$. Therefore, a main-fuel injection A (FIG. 8) to inject fuel from the fuel injector 6 into the combustion chamber 3 is carried out at a first predetermined crank angle. Note that the first predetermined crank angle according to the second embodiment is the same as the first predetermined crank angle according to the first embodiment. Fuel injected at the first predetermined crank is burned in the combustion chamber 3 to drive the engine.

Then, a sub fuel injection C (FIG. 8) to inject fuel from the fuel injector 6 into the combustion chamber 3 is carried out at a third predetermined crank angle. Note that the third predetermined crank angle according to the second embodiment is the same as the third predetermined crank angle according to the first embodiment. Fuel injected at the third predetermined crank angle is not burned and not thermally decomposed. The high-boiling-point HC flows into the $NO_x$ catalyst 10 to purify the $NO_x$.

When the temperature T of the $NO_x$ catalyst 10 is lower than the most suitable temperature $T_0$, it is determined that it is necessary to supply low-boiling-point HC. Note that the hydrocarbon having a relatively low boiling point is referred to as "low-boiling-point HC" in this specification. The low-boiling-point HC easily reacts with the $NO_x$ in the $NO_x$ catalyst 10 at a relatively lower temperature of the $NO_x$ catalyst 10 than the high-boiling-point HC.

Therefore, the main fuel injection A (FIG. 9) to inject fuel from the fuel injector 6 into the combustion chamber 3 is carried out at the first predetermined crank angle.

Then, an additional sub fuel injection B (FIG. 9) to inject fuel from the fuel injector 6 into the combustion chamber 3 is carried out at a second predetermined crank angle. Note that the second predetermined crank angle is at the middle of the power stroke of the engine. In the second embodiment, the additional sub fuel injection B is carried out at about 135 degrees after the top dead center of the power stroke of the engine. Fuel injected at the second predetermined crank angle is not burned but changes to thermally decomposed hydrocarbon having a relatively low boiling point. The low-boiling-point HC flows into the $NO_x$ catalyst 10 to react with the $NO_x$ in the $NO_x$ catalyst 10, and the reaction increases the temperature of the $NO_x$ catalyst 10.

Then, the sub fuel injection C (FIG. 9) to inject fuel from the fuel injector 6 into the combustion chamber 3 is carried out at the third predetermined crank angle. Fuel injected at the third predetermined crank angle is not burned and not thermally decomposed. The high-boiling-point HC flows into the $NO_x$ catalyst 10. The temperature of the $NO_x$ catalyst 10 becomes high due to the reaction heat of the low-boiling-point HC with the $NO_x$ when the high-boiling-point HC flows into the $NO_x$ catalyst 10 to purify the $NO_x$. Therefore, the high-boiling-point HC can easily react with the $NO_x$.

Although, according to the second embodiment, the additional sub fuel injection B is carried out at the middle of the power stroke of the engine, this does not limit the invention. The additional sub fuel injection B may be carried out at a crank angle between 90 degrees after the top dead center of the power stroke and 150 degrees after the top dead center of the power stroke if, at the crank angle, the temperature in the combustion chamber 3 is so high that fuel injected at the additional fuel injection can change to the low-boiling-point HC.

However, fuel injected at the crank angle between 90 degrees after the top dead center of the power stroke and 120 degrees after the top dead center of the power stroke is burned when fuel injected at the main fuel injection A is burned. The burning of the fuel injected at the crank angle between 90 degrees after the top dead center of the power stroke and 120 degrees after the top dead center of the power stroke leads to the torque change and loss of the hydrocarbon to be fed into the $NO_x$ catalyst 10. Therefore, preferably, the additional sub fuel injection B may be carried out at the crank angle between 120 degrees after the top dead center of the power stroke and 150 degrees after the top dead center of the power stroke.

Figure 10:
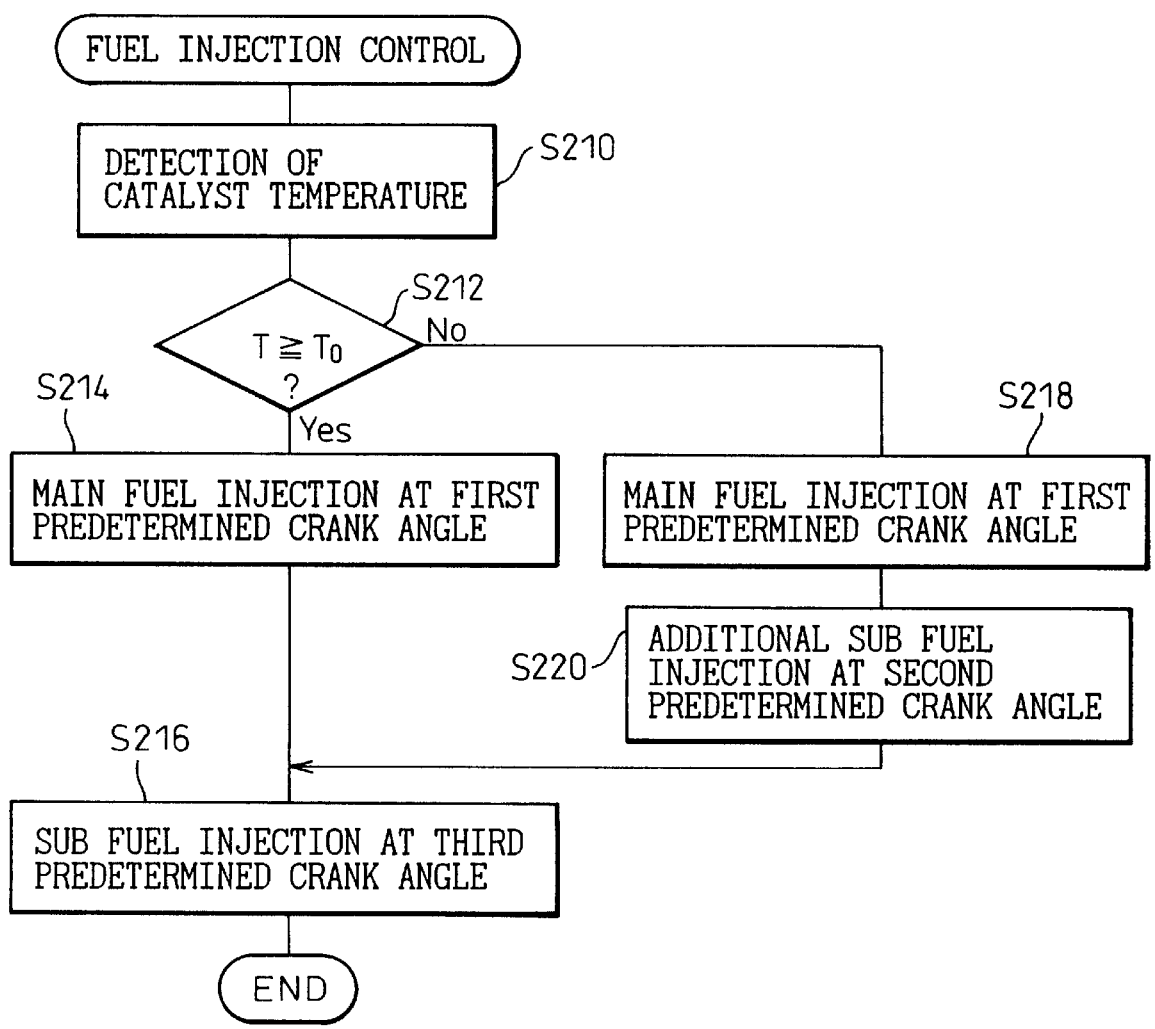
FIG. 10 is a flowchart of a fuel injection control according to the second embodiment of the invention.

FIG. 10 shows a flowchart illustrating fuel injection control according to the second invention. At step 210, the temperature T of the $NO_x$ catalyst 10 is detected, and the routine process to step 212.

At step 212, it is judged if the temperature T of the $NO_x$ catalyst 10 exceeds the most suitable temperature $T_0$ ($T \geq T_0$). At step 212, when $T \geq T_0$, the routine proceeds to step 214, where the main fuel injection A is carried out at the first predetermined crank angle, and the routine proceeds to step 216, where the sub fuel injection is carried out at the third predetermined crank angle, and the processing cycle is ended.

On the other hand, at step 212, when $T < T_0$, the routine proceeds to step 218, where the main fuel injection A is carried out at the first predetermined crank angle, the routine proceeds to step 120, where the additional sub fuel injection is carried out at the second predetermined crank angle, and the routine proceeds to step 216, where the sub fuel injection is carried out at the third predetermined crank angle, and the processing cycle is ended.

Although, according to the second embodiment, the additional sub fuel injection B is determined to be carried out on the basis of the comparison of the temperature of the $NO_x$ catalyst 10 with the most suitable temperature, this does not limit the invention. The sub fuel injection C may be carried out when the temperature of the $NO_x$ catalyst 10 is within a suitable temperature range in which the $NO_x$ catalyst 10 purifies the $NO_x$ at a relatively high ratio (for example, between the temperatures $T_1$ and $T_2$ in FIG. 2), the additional sub fuel injection B may be carried out when the temperature of the $NO_x$ catalyst 10 is lower than the suitable temperature range, and no sub-fuel injection may be carried out when the temperature of the $NO_x$ catalyst 10 is higher than the suitable temperature range.

A fuel injection control device for a direct injection type engine according to a third embodiment will be described in below.

FIG. 11 shows a fuel injection control device for a direct injection type engine according to the third embodiment. In addition to the first embodiment, an oxidizing catalyst 18 is arranged in the exhaust passage 8 upstream of the $NO_x$ catalyst 10. The oxidizing catalyst 18 oxidizes CO in the exhaust gas to purify the CO. Note that carbon monoxide is referred to as CO in this specification. A HC supply means 20 to supply the $NO_x$ catalyst 10 with HC is arranged in the exhaust gas between the oxidizing catalyst 18 and the $NO_x$ catalyst 10. The output port 46 is connected to the HC supply means 20 via an associated drive circuit 50.

Explanations of other components of the fuel injection control device according to the third embodiment are omitted since these components are the same as the device according to the first embodiment.

During the operation of the fuel injection control device according to the third embodiment, first, it is judged if temperature T of the $NO_x$ catalyst 10 exceeds the most suitable temperature $T_0$.

When the temperature of the $NO_x$ catalyst 10 exceeds the most suitable temperature $T_0$, it is determined that it is not necessary to increase the temperature of the $NO_x$ catalyst 10 in order to continuously make the temperature of the $NO_x$ catalyst 10 the most suitable temperature $T_0$. Therefore, a main fuel injection A to inject fuel from the fuel injector 6 into the combustion chamber 3 is carried out at a first predetermined crank angle. Note that the first predetermined crank angle according to the second embodiment is the same as the first predetermined crank angle according to the first embodiment. Fuel injected at the first predetermined crank is burned in the combustion chamber 3 to drive the engine.

Then, hydrocarbon is fed from the HC supply means 20 into the $NO_x$ catalyst 10 to purify the $NO_x$.

When the temperature of the $NO_x$ catalyst 10 is lower than the most suitable temperature $T_0$, it is determined that the temperature of the oxidizing catalyst 18 is so low that the oxidizing catalyst 18 can not purify the CO. Therefore, it is also determined that it is necessary to supply low-boiling-point HC and increase the temperature of the catalysts 10 and 18.

Therefore, the main fuel injection A to inject fuel from the fuel injector 6 into the combustion chamber 3 is carried out at the first predetermined crank angle.

Then, an additional sub fuel injection B to inject fuel from the fuel injector 6 into the combustion chamber 3 is carried out at a second predetermined crank angle. Note that the second predetermined crank angle according to the third embodiment is the same as the second predetermined crank angle according to the second embodiment. Fuel injected at the second predetermined crank angle is not burned but changes to thermally decomposed hydrocarbon having a relatively low boiling point. The low-boiling-point HC flows into the $NO_x$ catalyst 10 to react with the $NO_x$ in the $NO_x$ catalyst 10, and the reaction increases the temperature of the $NO_x$ catalyst 10.

Then, a sub fuel injection C to inject fuel from the fuel injector 6 into the combustion chamber 3 is carried out at a third predetermined crank angle. Note that the third predetermined crank angle according to the third embodiment is the same as the third predetermined crank angle according to the second embodiment. Fuel injected at the third predetermined crank angle is not burned and not thermally decomposed. The high-boiling-point HC flows into the $NO_x$ catalyst 10. The temperature of the $NO_x$ catalyst 10 becomes high due to the reaction heat of the low-boiling-point HC with the $NO_x$ when the high-boiling-point HC flows into the $NO_x$ catalyst 10 to purify the $NO_x$. Therefore, the high-boiling-point HC can easily react with the $NO_x$.

FIG. 12 shows a flowchart illustrating fuel injection control according to the third embodiment. At step 310, temperature T of the $NO_x$ catalyst 10 is detected, and the routine proceeds to step 312.

At step 312, it is judged if the temperature T of the $NO_x$ catalyst 10 exceeds the most suitable temperature $T_0$ ($T \geq T_0$). At step 312, when $T \geq T_0$, the routine proceeds to step 314, where the main fuel injection A is carried out at the first predetermined crank angle, and the routine proceeds to step 316, where hydrocarbon is fed from the HC supply means, and the processing cycle is ended.

On the other hand, at step 312, when $T < T_0$, the routine proceeds to step 318, where the main fuel injection A is carried out at the first predetermined crank angle, the routine proceeds to step 320, where the additional sub fuel injection is carried out at the third predetermined crank angle, and the routine proceeds to step 322, where the sub fuel injection is carried out at the third predetermined crank angle, and the processing cycle is ended.

Note that the invention can be applied to any plug-ignition combustion engine which is operated under oxygen-rich atmosphere. Further, the invention can be applied to any engine comprising a $NO_x$ catalyst which absorbs the $NO_x$ when the air-fuel ratio of the exhaust gas is lean compared to the stoichiometric ratio, and discharges the absorbed $NO_x$ when the air-fuel ratio of the exhaust gas is rich compared to the stoichiometric ratio.

While the invention has been described by reference to specific embodiments chosen for purposes of illustration, it should be apparent that numerous modifications can be made thereto by those skilled in the art without departing from the basic concept and scope of the invention.

We claim:

1. A fuel injection control device for a direct injection type engine having an exhaust passage and a $NO_x$ catalyst arranged therein to purify $NO_x$ in exhaust gas discharged from the engine, said device comprising:

fuel injection means for injecting fuel into a cylinder;

main fuel injection control means for controlling the injecting operation of said fuel injection means to carry out a main fuel injection at the latest at the beginning of a power stroke of the engine;

sub fuel injection control means for controlling the injecting operation of said fuel injection means to carry out a sub fuel injection at one of a power stroke and an exhaust stroke of the engine after the main fuel injection is completed to increase an amount of hydrocarbon in the exhaust gas; and additional sub fuel injection control means for controlling the injecting operation of said fuel injection means to carry out an additional sub fuel injection after the main fuel injection is completed and before the sub fuel injection is carried out.

2. A fuel injection control device according to claim 1, wherein said additional sub fuel injection control means carries out the additional sub fuel injection when the temperature of the $NO_x$ catalyst is lower than a predetermined temperature, and stops the additional sub fuel injection when the temperature of the $NO_x$ catalyst exceeds the predetermined temperature.

3. A fuel injection control device according to claim 2, wherein the fuel from the additional sub fuel injection is burned.

4. A fuel injection control device according to claim 3, wherein the additional sub fuel injection is carried out at a crank angle between the top dead center of the power stroke and 120 degrees after the top dead center of the power stroke.

5. A fuel injection control device according to claim 4, wherein the additional sub fuel injection is carried out at a crank angle between 90 degrees after the top dead center of the power stroke and 120 degrees after the top dead center of the power stroke.

6. A fuel injection control device according to claim 1, wherein the fuel from the additional sub fuel injection changes to thermally decomposed hydrocarbon.

7. A fuel injection control device according to claim 6, wherein the additional sub fuel injection is carried out at a crank angle between 90 degrees after the top dead center of the power stroke and 150 degrees after the top dead center of the power stroke.

8. A fuel injection control device according to claim 7, therein the additional sub fuel injection is carried out at a crank angle between 90 degrees after the top dead center of the power stroke and 120 degrees after the top dead center of the power stroke.

9. A fuel injection control device according to claim 1, wherein an oxidizing catalyst for oxidizing carbon monoxide in the exhaust gas is arranged in the exhaust passage upstream of the $NO_x$ catalyst, hydrocarbon feeding means for feeding hydrocarbon into the $NO_x$ catalyst is arranged in the exhaust passage between the oxidizing catalyst and the $NO_x$ catalyst, hydrocarbon feeding control means is provided for controlling the feeding operation of said hydrocarbon feeding means, said hydrocarbon feeding control means carries out the feeding operation of said hydrocarbon feeding means and said sub fuel injection control means and said additional sub injection control means stop the sub fuel injection and the additional sub fuel injection, respectively, when the temperature of the $NO_x$ catalyst is higher than a predetermined temperature, and said hydrocarbon feeding control means stops the feeding operation of said hydrocarbon feeding means and said sub fuel injection control means and said additional sub injection control means carry out the sub fuel injection and the additional sub fuel injection, respectively when the temperature of the $NO_x$ catalyst is lower than the predetermined temperature.

* * * * *

UNITED STATES PATENT AND TRADEMARK OFFICE
CERTIFICATE OF CORRECTION

PATENT NO. : 5,839,275
DATED : November 24, 1998
INVENTOR(S) : Shinya HIROTA, et al.

It is certified that error appears in the above-identified patent and that said Letters Patent is hereby corrected as shown below:

Column 1, line 17, change "$NO_x$. In" to --$NO_x$ in--.

Column 3, line 11, before "invention" insert --the--.

Column 4, line 17, after "crank" insert --angle--.

Column 6, line 30, between "to" and "an" insert --as--.

Column 6, line 33, delete "in" at beginning of line.

Column 6, line 42, after "exceeds" insert --the--.

Column 6, line 52, after "crank" insert --angle--.

Column 7, line 59, change "process" to --proceeds--.

Column 8, line 23, delete "in" at end of line.

Column 8, line 31, change "A HC" to --An HC--.

UNITED STATES PATENT AND TRADEMARK OFFICE
CERTIFICATE OF CORRECTION

PATENT NO. : 5,839,275
DATED : November 24, 1998
INVENTOR(S) : Shinya HIROTA, et al.

It is certified that error appears in the above-identified patent and that said Letters Patent is hereby corrected as shown below:

Column 8, line 38, insert "in" before --the device--.

Column 8, line 54, after "crank" insert --angle--.

Column 10, line 41, change "therein" to --wherein--.

Signed and Sealed this

Eighteenth Day of April, 2000

Q. TODD DICKINSON

*Attest:*

*Attesting Officer*   *Director of Patents and Trademarks*